US009942252B1

(12) United States Patent
Kondaveeti et al.

(10) Patent No.: US 9,942,252 B1
(45) Date of Patent: Apr. 10, 2018

(54) GRAPH-BASED TECHNIQUES FOR DETECTING COORDINATED NETWORK ATTACKS

(71) Applicant: EMC Corporation, Hopkinton, MA (US)

(72) Inventors: Anirudh Kondaveeti, Foster City, CA (US); Jin Yu, Melbourne (AU)

(73) Assignee: EMC IP Holding Co. LLC, Hopkinton, MA (US)

(*) Notice: Subject to any disclaimer, the term of this patent is extended or adjusted under 35 U.S.C. 154(b) by 112 days.

(21) Appl. No.: 14/976,168

(22) Filed: Dec. 21, 2015

Related U.S. Application Data

(60) Provisional application No. 62/215,624, filed on Sep. 8, 2015.

(51) Int. Cl.
| | | |
|---|---|---|
| G06F 11/00 | (2006.01) | |
| G06F 12/14 | (2006.01) | |
| G08B 23/00 | (2006.01) | |
| H04L 29/06 | (2006.01) | |

(52) U.S. Cl.
CPC ...... *H04L 63/1416* (2013.01); *H04L 63/0227* (2013.01); *H04L 63/0281* (2013.01)

(58) Field of Classification Search
CPC .................................................. H04L 63/1416
USPC ......................................................... 726/23
See application file for complete search history.

(56) References Cited

U.S. PATENT DOCUMENTS

| | | | | |
|---|---|---|---|---|
| 8,494,985 B1* | 7/2013 | Keralapura | ......... | H04L 63/0245 706/12 |
| 8,661,062 B1* | 2/2014 | Jamail | ................... | G06F 21/554 707/802 |
| 9,043,894 B1* | 5/2015 | Dennison | .............. | G06F 21/552 726/11 |
| 9,635,049 B1* | 4/2017 | Oprea | ................... | H04L 63/145 |
| 2014/0079297 A1* | 3/2014 | Tadayon | .................. | G06K 9/00 382/118 |
| 2014/0090056 A1* | 3/2014 | Manadhata | ........... | G06F 21/552 726/23 |
| 2014/0201126 A1* | 7/2014 | Zadeh | .................... | G06K 9/627 706/52 |
| 2014/0215487 A1* | 7/2014 | Cherkasova | .......... | G06F 9/5083 718/106 |

OTHER PUBLICATIONS

Akoglu et al., What is Strange in Large Networks? Graph-based Irregularity and Fraud Detection, International Conference on Data Mining, Brussels, Dec. 10, 2012.
Akoglu et al., OddBall: Spotting Anomalies in Weighted Graphs, PAKDD, Hyberabad, India, Jun. 2010.
Mohammed J. Zaki, SPADE: An Efficient Algorithm for Mining Frequent Sequences, Machine Learning, vol. 42, Issue 1-2, 2001.
Agrawal et al., Fast Algorithms for Mining Association Rules, Proceedings of the 20th VLDB Conference, Santiago, Chile, 1994.

\* cited by examiner

*Primary Examiner* — Taghi Arani
*Assistant Examiner* — Khalil Naghdali
(74) *Attorney, Agent, or Firm* — Barry N. Young

(57) ABSTRACT

One or more proxy logs are processed in order to generate a graph of domains, wherein those domain pairs in the graph that are connected have low support and high confidence. One or more domains within the graph that are highly connected to other domains in the graph are identified. The identified domains are flagged as suspicious domains.

14 Claims, 12 Drawing Sheets

Connection Time and Domain Information for a Given User — 500

510, 512, 514

| 1st Domain in Pair | 2nd Domain in Pair | Confidence | Support |
|---|---|---|---|
| russianembassy.org | twitter.com | | |
| russianembassy.org | twimg.com | | |
| russianembassy.org | ... | | |
| russianembassy.org | mobilemarketcenter.com | | |
| twitter.com | twimg.com | | |
| twitter.com | goo.gl | | |
| twitter.com | ... | | |
| twitter.com | mobilemarketcenter.com | | |
| twimg.com | goo.gl | | |
| ... | ... | | |

550

560, 562

570, 572 — All Possible Domain Pairs for a Given User

FIG. 5

$$OddBall\_ratio := \log(E)/\log(N)$$

— 600

$$clique\_percentage := \frac{E}{(N^2+N)/2}$$

— 610

GRAPH-BASED TECHNIQUES FOR DETECTING COORDINATED NETWORK ATTACKS

CROSS REFERENCE TO OTHER APPLICATIONS

This application claims priority to U.S. Provisional Patent Application No. 62/215,624 entitled DISCOVERING DOMAIN ASSOCIATIONS FOR WATERING HOLE ATTACK DETECTION filed Sep. 8, 2015 which is incorporated herein by reference for all purposes.

BACKGROUND OF THE INVENTION

Watering hole attacks are an attack in which a legitimate domain (e.g., a website) is infected and the infection causes the domain to forward visitors to a second, malicious domain. The second, malicious domain hosts an exploit kit which is downloaded to the visitor's device and may be used to steal the credentials of the visitor (e.g., username, password, etc.). New techniques which are able to detect watering hole attacks would be desirable. It would be even more desirable if such detection techniques were able to process large amounts of data in a relatively short amount of time. Typically, security-related detection processes must ingest large amounts of data and it would be desirable if new watering hole attack detection techniques could complete in a relatively short amount of time. In some cases, these detection techniques may also work on detecting other types of attacks, such as bot-net attacks.

BRIEF DESCRIPTION OF THE DRAWINGS

Various embodiments of the invention are disclosed in the following detailed description and the accompanying drawings.

FIG. 5 is a diagram illustrating an embodiment of user-specific sessionization when association rule mining is used.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
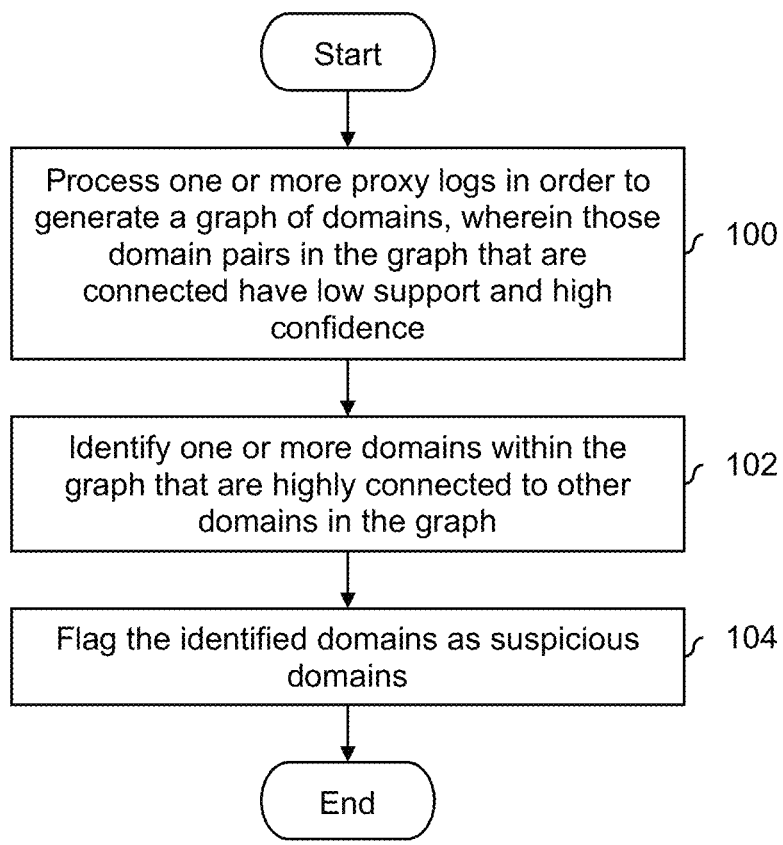
FIG. 1 is a flowchart illustrating an embodiment of a process for detecting attacks, such as watering hole and bot-net attacks, using graphs.

FIG. 1 is a flowchart illustrating an embodiment of a process for detecting attacks, such as watering hole and bot-net attacks, using graphs. In various embodiments, the process may be performed in a distributed manner (e.g., where every device processes its own proxy logs to detect an attack) or in a centralized manner (e.g., where multiple devices send their proxy logs to some centralized device which performs attack detection). Some example systems which perform the process of FIG. 1 are described in more detail below.

At 100, one or more proxy logs are processed in order to generate a graph of domains, wherein those domain pairs in the graph that are connected have low support and high confidence. Generally speaking, proxy logs record or otherwise log internal-to-external network connections and may include information such as internal user accounts (e.g., a user name), internal or source domain names, external or destination domain names, and/or connection times. In various embodiments, a domain name (e.g., an internal or external domain name recorded in a proxy log) may include any of the following: an IP address, a host name, or a URL.

To clearly describe the technique, each node in the graph is a domain in examples described herein. Another characteristic common to examples described herein is that edges (which connect two domains together) are undirected (e.g., domain A↔domain B as opposed to domain A→domain B or domain B→domain A) and there is no weighting or value associated with the edges (again for clarity). In some embodiments it may be desirable to use a directed graph representation and weighted edges, but that would slow down the detection process. Therefore, although the examples described herein show undirected edges and no weighting, these configurations are merely exemplary and are not intended to be limiting.

The support value associated with a particular domain pair (i.e., the first characteristic referred to in step 100) is the proportion, frequency, or probability that a particular pair of domains occurs in some group. The confidence value associated with a particular domain pair A→B, (i.e., the second characteristic referred to in step 100) is defined as the ratio of the support of the domain pair (e.g., domain A and domain B) to the support of domain A.

Generally speaking, a graph where only domain pairs which have low support and high confidence are connected are constructed at step 100 because those are characteristics that tend to be exhibited by systems under attack, such as a watering hole attack. An example of a watering hole attack where the infected watering hole domain and a malicious domain (e.g., which hosts an exploit kit) exhibit low support and high confidence between the two domains is described in more detail below.

At 102, one or more domains within the graph that are highly connected to other domains in the graph are identified. Another characteristic exhibited by malicious domains (e.g., to which an infected watering hole directs visitors and/or which hosts an exploit kit) is that they tend to be highly connected to other domains in the graph. An example of this is described in more detail below, including some metrics which may be used to measure connectivity for a given domain in the graph.

In some embodiments, identification at step 102 targets domains (or domain characteristics) associated with watering hole attacks, for example where a highly connected structure is displayed by the graph. In some embodiments, identification at step 102 targets domains (or domain characteristics) associated with bot-net attacks. For example, in a typical bot-net structure, isolated groups of domains only interact with some domains but not all domains in the graph. Examples of both are described in more detail below.

At 104, the identified domains are flagged as suspicious domains. For example, a flagged domain may host an exploit kit which makes communicating with that domain dangerous. Further investigation and/or security countermeasures may be taken as desired. For example, if a given domain is flagged, then access to that domain may be restricted at least temporarily. For example, a company may configure its firewalls so that employees inside of the firewall cannot access that domain. In addition to or as an alternative to that, the flagged domain can be scrutinized or investigated further to determine if it is indeed hosting an exploit kit and if appropriate other people, companies, or entities can be notified so that they can protect themselves from the flagged domain.

The following figure shows an example why domain pairs with low support and high confidence are of interest at step 100.

Figure 2:
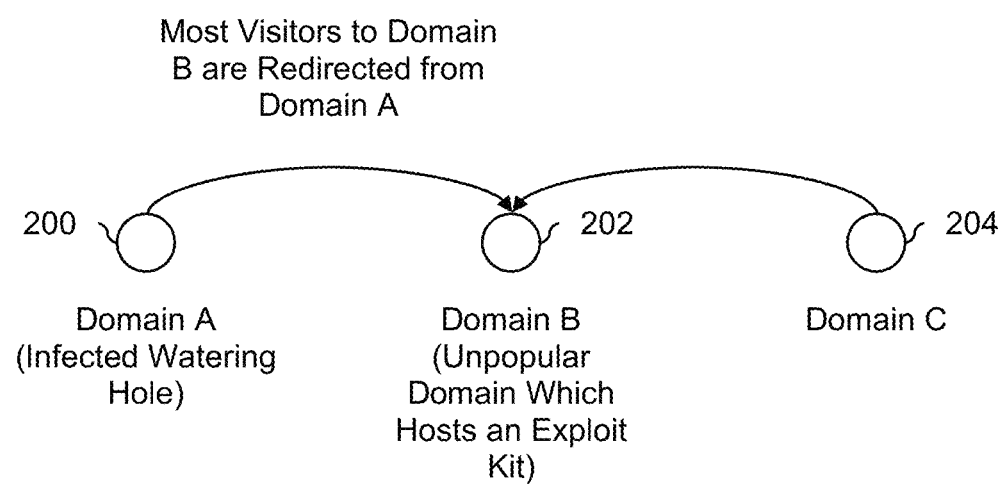
FIG. 2 is a diagram illustrating an embodiment of a domain pair which exhibits low support and high confidence.

FIG. 2 is a diagram illustrating an embodiment of a domain pair which exhibits low support and high confidence. In the example shown, domain A (200) is an infected watering hole. For example, domain A may be outside of some firewall or protected network (not shown), but a user within the protected network accesses the infected watering hole for whatever reason. In some embodiments, the domains shown are websites/webservers.

As a result of the infection, domain A (200) redirects the user to domain B (202) which hosts an exploit kit. The exploit kit is downloaded from domain B (202) to the user's device (not shown) and is used to subsequently steal the credentials of the user (e.g., user name, password, etc.).

Domains which host exploit kits (such as domain B) tend to be unpopular. For example, if all of the domains visited by users in a company over some period of time were examined, the number of times domain B (202) were visited would tend to be low. This is a conceptual example of the low support characteristic. The domain pair (domain A, domain B) will have low support because few people visit domain B which in turn causes the even more narrow case of (domain A, domain B) to also have low support.

Another property of the exemplary domains shown is that visitors to domain B (202) are almost always redirected from domain A (200). For simplicity, assume that there are only three domains total (e.g., globally). Only a few visitors to domain B visited domain A (204) first. This implies that the conditional probability of the sequence (domain A, domain B) given a visit to domain A first is high. This is a conceptual example of the second property (i.e., high confidence).

The following figure shows an example of a malicious domain, which is highly connected to other nodes in a graph and why such domains are of interest at step 102 in FIG. 1.

Figure 3:
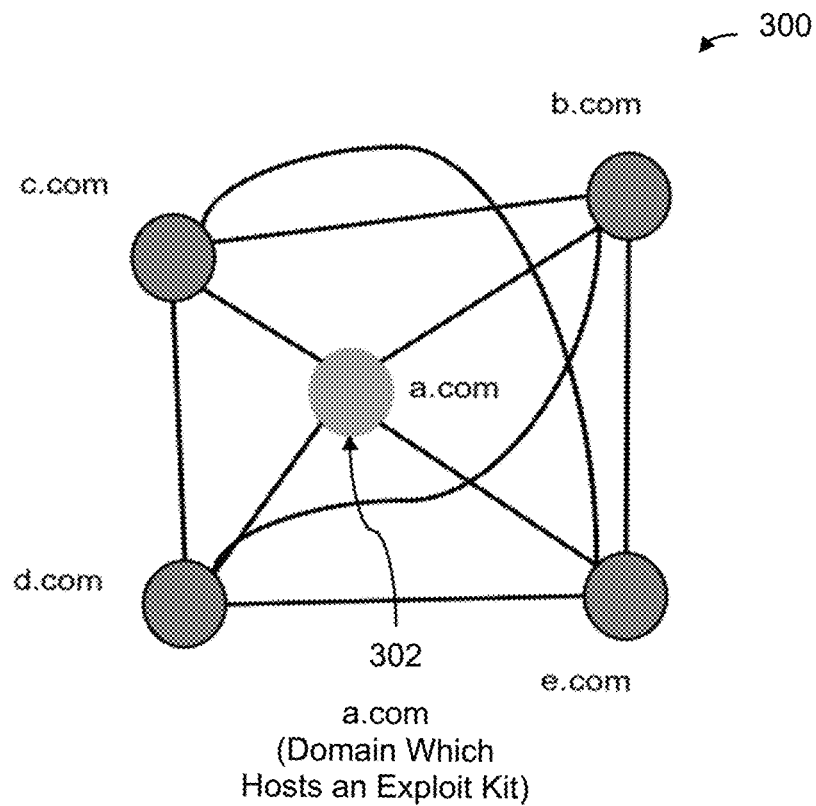
FIG. 3 is a diagram illustrating an embodiment of a graph associated with a watering hole attack.

FIG. 3 is a diagram illustrating an embodiment of a graph associated with a watering hole attack. In the example shown, graph 300 includes a number of domains, some of which are connected to each other. Domain 302 (a.com) is a malicious domain, which hosts an exploit kit. For example, domain 302 may be domain 202 in FIG. 2 to which visitors to an infected watering hole (e.g., domain 200) are directed after visiting the infected watering hole. As is shown in graph 300, domain 302 is tightly connected to other domains or nodes (e.g., it is connected to every other node in the graph). So, generally speaking, partially and/or fully connected networks may indicate an attack, such as a watering hole attack or a bot-net attack.

Referring back to step 102 in FIG. 1, step 102 may include determining a connectivity metric or value for each node (domain) in graph 300. Then, those domains, which have a connectivity value that is greater than some threshold, are the ones that are identified at step 102. Some connectivity metric examples are described in more detail below.

The following figures show some more detailed examples of steps from FIG. 1. First, a more detailed example of step 100 is described. Then, a more detailed example of step 102 is described.

Figure 4:
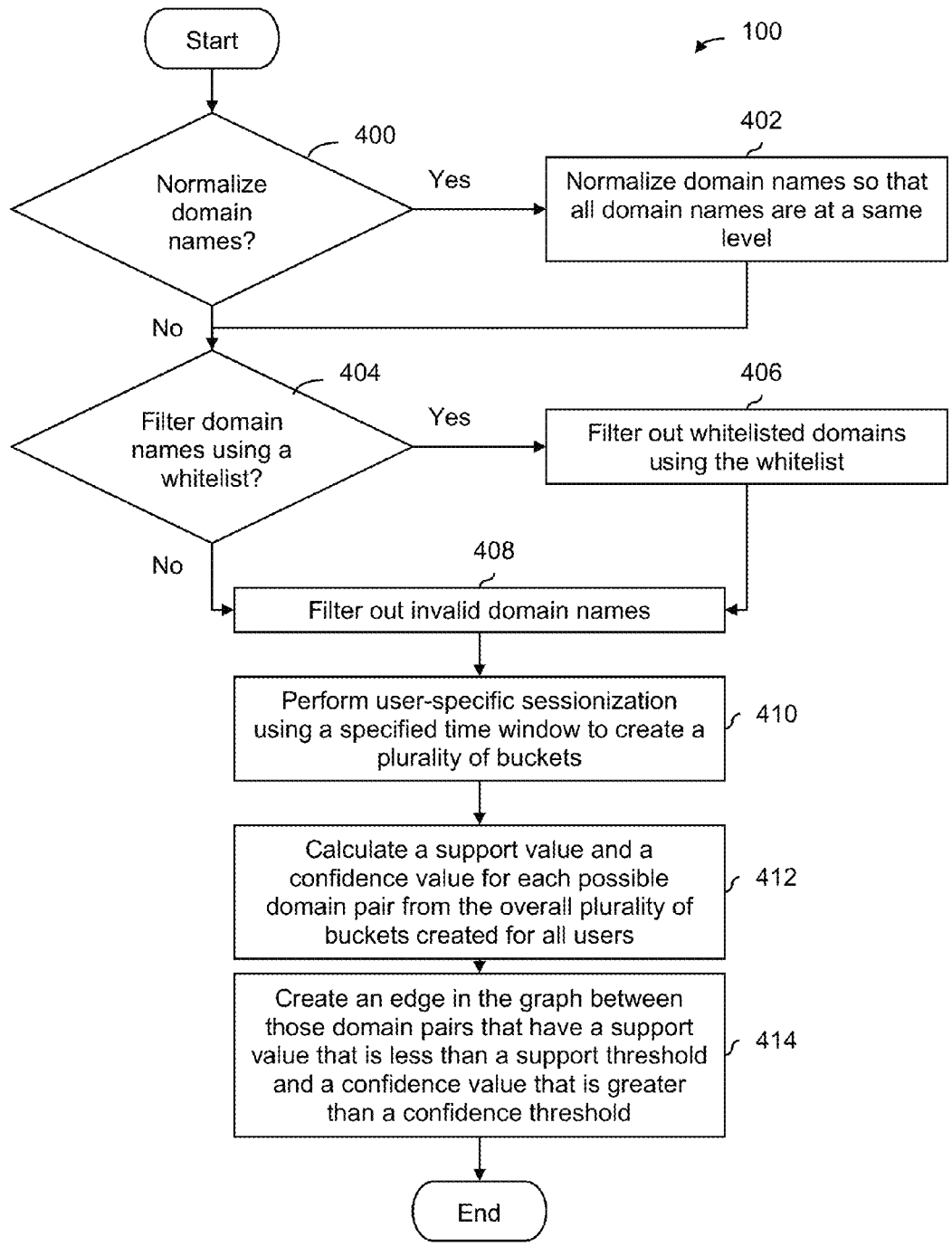
FIG. 4 is a flowchart illustrating an embodiment of a process for generating a graph.

FIG. 4 is a flowchart illustrating an embodiment of a process for generating a graph. In some embodiments, step 100 in FIG. 1 includes the process of FIG. 4. It is noted that the sequence of steps shown herein is merely exemplary and is not intended to be limiting.

At 400, it is decided whether to normalize domain names. In some embodiments, this decision depends on how whitelist filtering is performed (assuming whitelist filtering is performed). For example, in some embodiments, whitelist filtering is performed in a strict manner where a subdomain (e.g., <x>.<y>.<z>) must be explicitly included in a whitelist in order to be considered "safe" even if a related upper level domain (e.g., <y>.<z>) is included in the whitelist. In one example where whitelist filtering is performed in this strict manner, the decision at step 400 is made on a domain-by-domain basis. For example, if at least some part of a domain name is included in the whitelist, then the decision at step 400 would be "Yes" (e.g., so that all levels of a domain name are available so that filtering can be performed properly). If no part of the domain name is included in the whitelist, then normalization is performed. Alternatively, a single decision at step 400 may be made for all domains (i.e., all domain names in the proxy logs are normalized or all domain names in the proxy logs are not normalized).

If it is decided at step 400 to normalize domain names, then at 402 domain names are normalized so that all domain names are at a same level. For example, supposed domain names are normalized to the second level. This would cause the domain name translate.google.com.au to be normalized to google.com.au. In some embodiments, normalization is desirable because it produces a more stable and/or smaller list of domains.

After normalization at step 402, or if it is decided not to normalize at step 400, it is decided whether to filter domain names using a whitelist at 404. If so, whitelisted domains are filtered out using the whitelist at 406. As described above, filtering at step 406 may be performed in as strict or relaxed manner. In one example with strict filtering, suppose a whitelist includes no-ip.com (e.g., which may be a dynamic DNS site) as a whitelisted domain. The domain no-ip.com would be filtered out because it is included in the whitelist (and is therefore believed to be a harmless domain) but its subdomains (e.g., foo.no-ip.com) would not be filtered out. Alternatively, if filtering is performed in a relaxed manner, then all subdomains would be filtered out if a related, higher level domain were included in the whitelist.

After filtering at step 406 or if it is decided not to perform filtering at step 404, invalid domain names are filtered out at 408. For example, a user may have a typographical error and tried to access the domain www.dell,ca (where the comma should be replaced by a period). Domain names which violate some set of rules or go nowhere may be filtered out.

At 410, user-specific sessionization is performed using a specified time window to create a plurality of buckets. Generally speaking, user-specific sessionization refers to the division of information according to user so that information associated with different users is not mixed together. The following figure shows a more detailed example of step 410.

FIG. 5 is a diagram illustrating an embodiment of user-specific sessionization when association rule mining is used. In some embodiments, the process described in this figure is used at step 410 in FIG. 4.

Diagram 500 shows connection times and second-level, external domains visited by a particular user. As described above, during user-specific sessionization, information is divided up according to user so that information from different users is not mingled together. Later on (e.g., after sessionization is done for all users), the sessionized information may be mixed back together for subsequent analysis (e.g. for the calculation of support and confidence).

In this example, a time window of 30 seconds is used. Beginning with the first entry (i.e., russianembassy.org), the connection times are evaluated until a connection time is found that is 30 second after the connection time of the first entry (i.e., 2015-01-06 14:33:16). In this example, the connection time of google-analytics.com is 2015-01-06 14:33:48, which is 32 seconds after the connection time of russianembassy.org at 2015-01-06 14:33:16. As such, that entry is not included in the first basket (510).

The process then goes to the next entry (i.e., twitter.com with a connection time of 2015-01-06 14:33:17) and repeats the process. As before, the connection time of google-analytics.com at 2015-01-06 14:33:48 is more than 30 seconds after the connection time of twitter.com (14:33:48–14:33:17=31 seconds, which is greater than 30 seconds) and therefore google-analytics.com is not included in the second basket (512).

This process is repeated at third time where twimg.com is the first entry in the third basket (514). This time, the connection time of google-analytics.com is within the 30 second time window and it is included in the third basket (514). This process is repeated for the rest of the entries in diagram 500, but to preserve readability only the first three baskets are shown in this figure.

Returning to FIG. 4, at 412, a support value and a confidence value are calculated for each possible domain pair from the overall plurality of buckets created for all users. For example, in FIG. 5, diagram 550 shows all possible domain pairs for the baskets shown in diagram 900. For readability, only domain pairs associated with the first two baskets (i.e., 510 and 512) are shown. For each basket, the first element in a pair comprises the first domain in the basket. The second element in the pair comprises the second domain, the third domain, and so on in the basket. For example, domain pairs 560 correspond to the first basket (510) and domain pairs 562 correspond to the second basket (512).

In some embodiments, a massively parallel database (such as Pivotal Greenplum) is used to generate the baskets shown in diagram 500. In some embodiments, a window function is used and/or created to make the process go faster. Such a window function may be provided a time window (e.g., 30 second) to apply to pre-processed or cleaned up proxy log information). Given the time window, the window function assigns domains to appropriate basket(s). In one test, it took ~30 minutes to do domain-to-basket assignment using the Greenplum window function on one month's worth of data.

For each possible domain pair for the given user in diagram 550, a confidence value and a support value for that domain pair are calculated. For example, a confidence value and a support value for domain pair 570 (russianembassy-.org, twitter.com) would be generated. Then, a confidence value and a support value for domain pair 572 (russianembassy.org, twimg.com) would be generated and so on.

Returning to FIG. 4, at 414, an edge is created in the graph between those domain pairs that have a support value that is less than a support threshold and a confidence value that is greater than a confidence threshold. For example, in FIG. 5, the confidence values and support values for particular domain pair may be used to determine whether to create an edge between that particular domain pair (e.g., if those two domains have a sufficiently low support and sufficiently high confidence).

It is noted that steps 412 and 414 are performed on the overall plurality of buckets created for all users in the full dataset (i.e., steps 412 and 414 are not user-specific).

The following figures describe more detailed examples of step 102 in FIG. 1.

Figure 6:
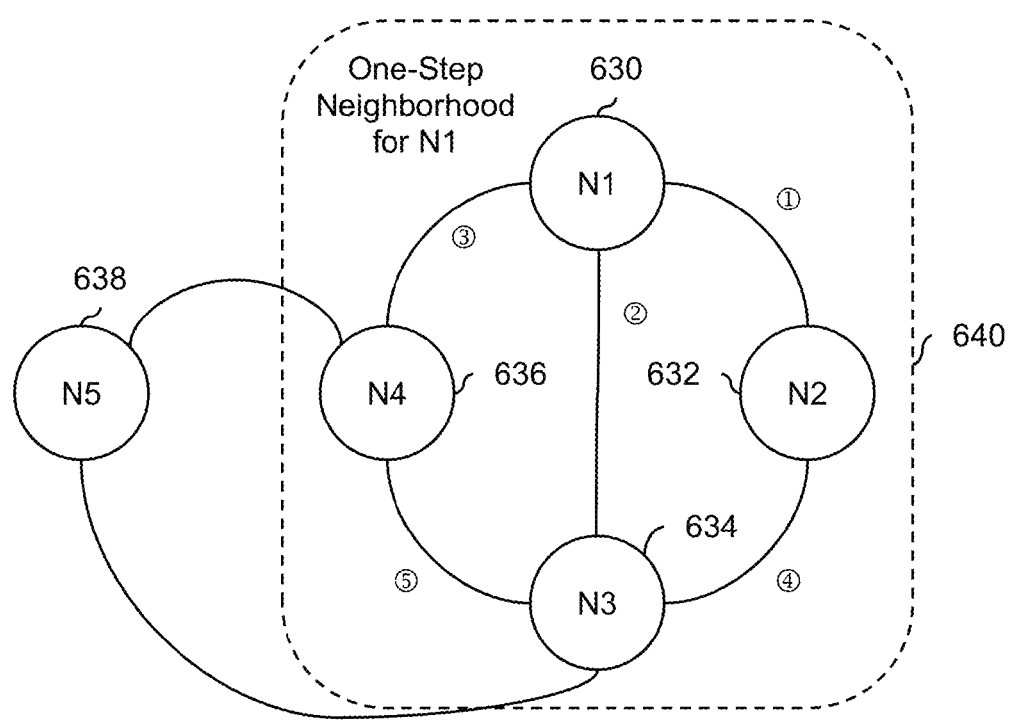
FIG. 6 is a diagram illustrating an embodiment of two connectivity metrics.

FIG. 6 is a diagram illustrating an embodiment of two connectivity metrics. In the example shown, diagram 600 shows an OddBall ratio and diagram 610 shows a clique percentage metric. These metrics are examples of connectivity metrics which may be used at step 102 to identify domains (nodes) in a graph that are highly connected to other domains (nodes) in the graph. More specifically, the values of the OddBall ratio or the clique percentage metric (as examples) may be calculated for each domain (node) in the graph and those with an OddBall ratio or a clique percentage metric greater than some connectivity threshold are identified and flagged (see, e.g., step 102 and step 104 in FIG. 1).

In the examples shown herein, N is the number of one-step neighbors. That is, N is the number of nodes that are connected to a given node by a single edge (e.g., without having to go through an intervening node and/or two or more edges). In graph 620, the node N1 (630) has 3 one-step neighbors (i.e., N2 (632), N3 (634), and N4 (636)). Node N5

(638) is not a one-step neighbor of N1 because two steps are needed to reach node N5 from N1 (i.e., N1→N4→N5).

E refers to the number of edges in the one-step neighborhood (sometimes referred to as an ego-net) for a given domain. For example, neighborhood 640 shows the one-step neighborhood for node N1 (630). For N1, E=5. There are the 3 edges between N1 (630) and the other nodes in the neighborhood, plus the edge between N2 (632) and N3 (634), plus the edge between N3 (634) and N4 (636).

Using N and E, the OddBall ratio (600) and the clique percentage (610) may be calculated. For the OddBall ratio, given the same number of neighbors, the higher the OddBall ratio, the higher degree of connectivity a network has. In some embodiments, domains with an OddBall ratio greater than 1.5 are flagged or identified for investigation. For clique percentage, a value close to 100% indicates a near-clique (i.e., highly connected) structure.

From such connectivity metrics, a connectivity value is calculated for each domain in the graph (e.g., all of nodes N1 (630)-N5 (638) in graph 620). Then, those domains with a connectivity value which is greater than some connectivity threshold are identified and flagged as potential hosts of an exploit kit.

Figure 7:
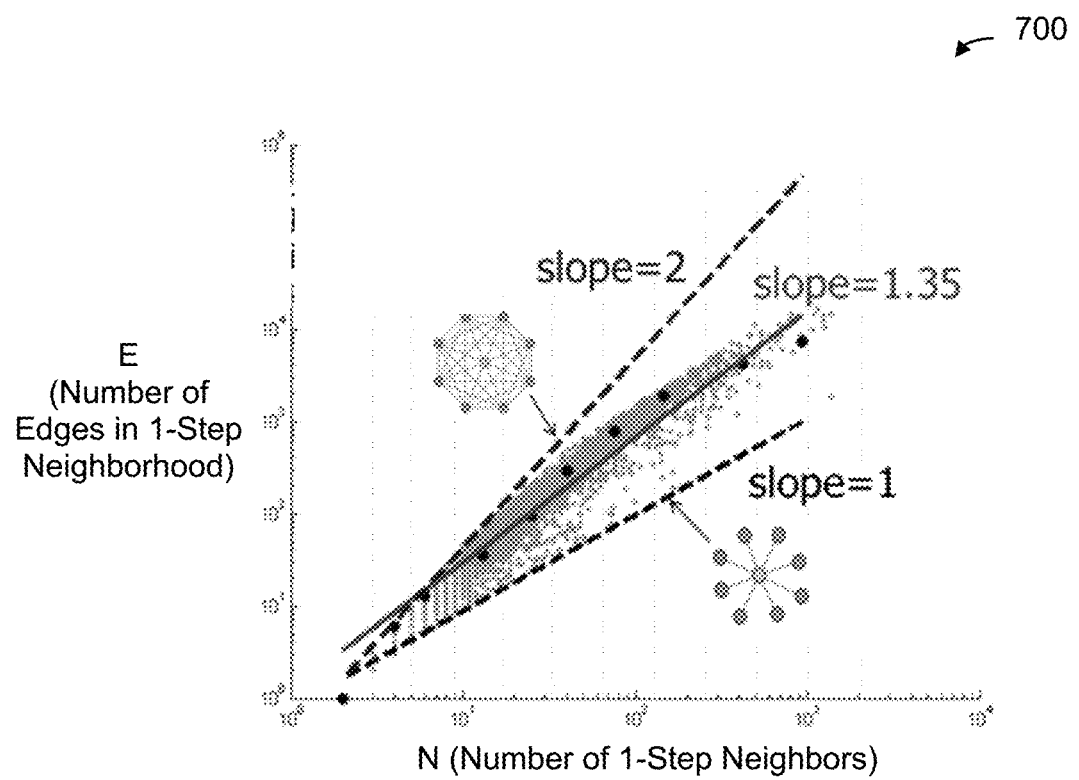
FIG. 7 is a diagram showing an example of typical types of graphs associated with different connectivity metrics.

FIG. 7 is a diagram showing an example of typical types of graphs associated with different connectivity metrics. N and E (described above) follow a power law:

$$E \propto N^\alpha, 1 \leq \alpha \leq 2.$$

Plot 700 shows the number of neighbors (N) versus the number of edges (E) is plotted in log-log scale for different one-step neighborhoods. A slope of 1 indicates or otherwise corresponds to a star-like network; a slope of 2 indicates or otherwise corresponds to a fully connected network (i.e., clique).

In some embodiments, the slope shown in this figure may be approximated by the Oddball ratio. As shown in this example, since a clique type of graph (e.g., corresponding to a slope of 2) is the type of graph being searched for (e.g., as opposed to a star type of graph corresponding to a slope of 1), in some embodiments, domains having an OddBall ratio greater than 1.5 is searched for.

Figure 8:
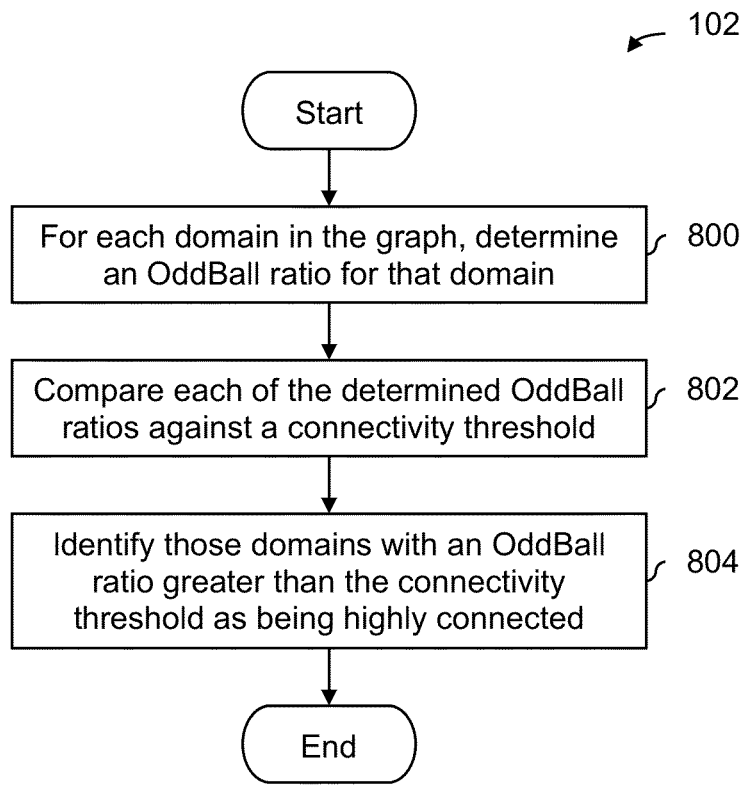
FIG. 8 is a flowchart illustrating an embodiment of a process to identify highly connected domains using an OddBall ratio.

FIG. 8 is a flowchart illustrating an embodiment of a process to identify highly connected domains using an OddBall ratio. In some embodiments, step 102 in FIG. 1 includes the process of FIG. 8.

At 800, for each domain in the graph, an OddBall ratio is determined for that domain. See, for example, diagram 600 in FIG. 6. Using the graph shown in diagram 620, the OddBall ratio would be determined for each of domains N1 (630)-N5 (638).

At 802, each of the determined OddBall ratios are compared against a connectivity threshold. For example, for OddBall ratios, a connectivity threshold of 1.5 may be used.

At 804, those domains with an OddBall ratio greater than the connectivity threshold are identified as being highly connected. In the context of FIG. 1, the identified domains would then be flagged as a malicious domain at step 104.

Figure 9:
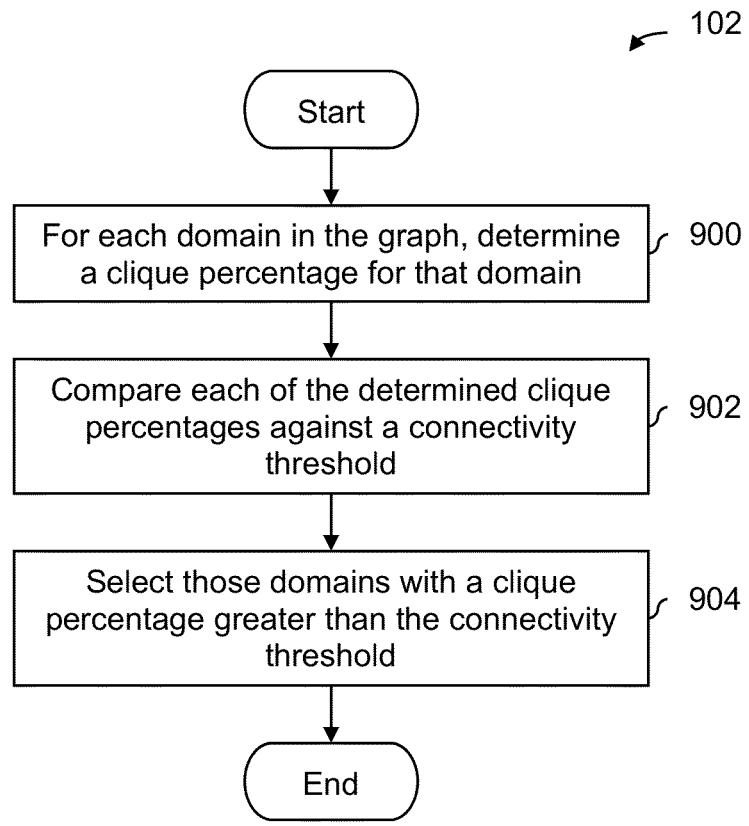
FIG. 9 is a flowchart illustrating an embodiment of a process to identify highly connected domains using a clique percentage.

FIG. 9 is a flowchart illustrating an embodiment of a process to identify highly connected domains using a clique percentage. In some embodiments, step 102 in FIG. 1 includes the process of FIG. 9.

At 900, for each domain in the graph, a clique percentage is determined for that domain. See, for example, diagram 610 in FIG. 6. Using the graph shown in diagram 620, the clique percentage would be determined for each of domains N1 (630)-N5 (638).

At 902, each of the determined clique percentages is compared against a connectivity threshold. For example, for a clique percentage, a connectivity threshold of 90% may be used.

At 904, those domains with a clique percentage greater than the connectivity threshold are selected. In the context of FIG. 1, the selected domains would then be flagged as a malicious domain at step 104.

As described above, the graph-based detection technique described in FIG. 1 may be used to detect watering hold attacks or (alternatively) bot-net attacks. The following figures describe some examples for detecting bot-net attacks. First, a typical bot-net graph is described so that that characteristics being searched for are understood.

Figure 10:
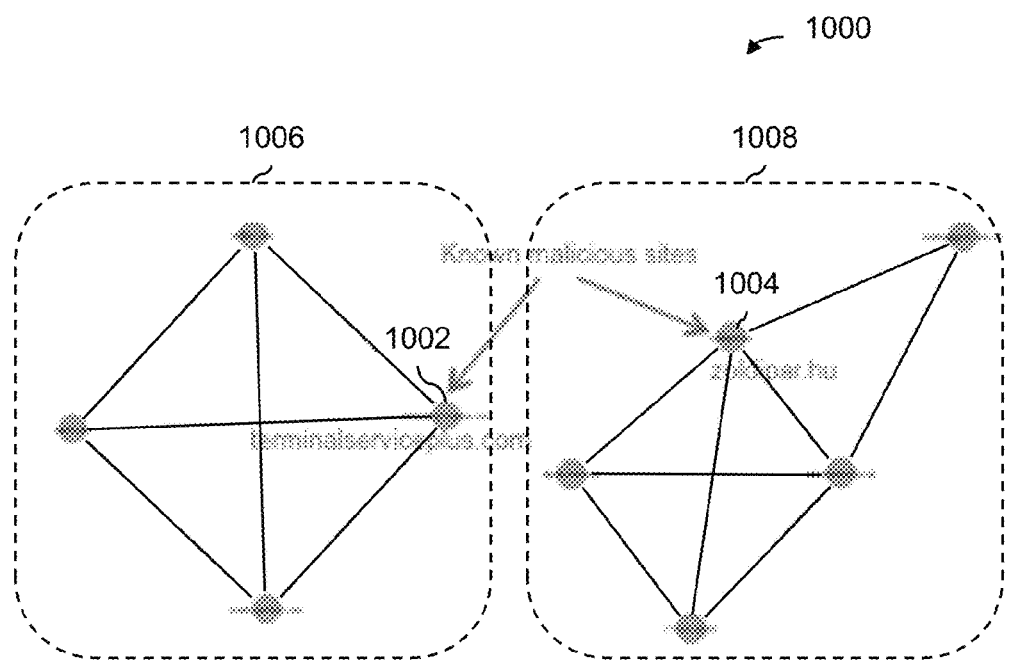
FIG. 10 is a diagram illustrating an embodiment of a graph associated with a bot-net attack.

FIG. 10 is a diagram illustrating an embodiment of a graph associated with a bot-net attack. In the example shown, diagram 1000 shows an example of connected components. Connected components are isolated groups of domains that only interact with domains in the same group, but not others domains in the graph. For example, malicious domain 1002 only interacts with the 3 domains in its connected component group (1006) and malicious domain 1004 only interacts with the other 4 domains in its connected component group (1008). This is a typical (if albeit extreme) example of a bot-net-like structure.

In some embodiments, step 102 in FIG. 1 includes detecting connected components in a graph, such as connected component 1006 or connected component 1008. One possible way of detecting connected components is to use a breath-first search. Starting with a node V, it recursively traverses all the nodes adjacent to V, and marks them as relating to V. At the end of the recursive procedure, all the nodes that are marked as relating to node V form one connected component.

In some embodiments, it is desirable to implement a connected component detection procedure such as the breath-first search procedure or its variants on a massively parallel database (such as Pivotal Greenplum) to handle large-scale graphs. As shown in this example, malicious sites (at least those associated with bot-net attacks) tend to exist in small connected components. This is because external adversaries typically only control a small number of malicious sites to carry out a coordinated network attack. Therefore, domains in connected components of size less than a threshold may be flagged as suspicious. For example, a threshold of 5 may be used.

Figure 11:
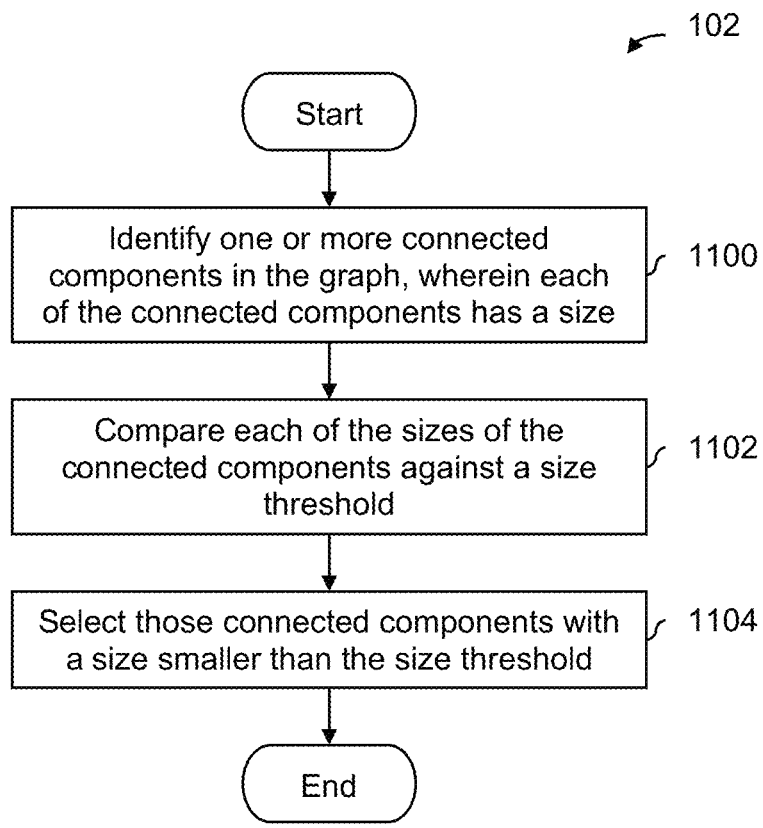
FIG. 11 is a flowchart illustrating an embodiment of a process for identifying connected components.

FIG. 11 is a flowchart illustrating an embodiment of a process for identifying connected components. In some embodiments, the process of FIG. 11 is used at step 102 in FIG. 1. Generally speaking, step 102 is looking for domains that are highly connected to other domains in the group. This includes domains that are highly connected to just some of the other domains in the group (e.g., connected components) as well as graphs where all of the domains are well-connected to each other (e.g., a clique). The exemplary process shown here falls into the former category.

At 1100, one or more connected components are identified in the graph, wherein each of the connected components has a size. For example, the breath-first search (described above) may be used.

At 1102, each of the sizes of the connected components is compared against a size threshold.

At 1104, those connected components with a size smaller than the size threshold are selected. In the context of FIG. 1, the selected domains would then be flagged as a malicious domain at step 104.

In some embodiments, other data sources may be used to supplement or otherwise in combination with the graph-based techniques described above. Some examples are described below.

In some embodiments, indicators of compromise (IOC) domains are used as seeds from which Reputation Propagation is applied to the domain correlation graph to detect unknown malicious sites relating to IOC domains. For example, if a domain is directly or indirectly connected to IOC domains through one or a small number of edges, then it may be flagged as suspicious due to its close relationship with known compromised domains.

In some embodiments, filtering (e.g., using a whitelist at step 406 in FIG. 4) includes filtering out legitimate domain redirection due to a same owner (i.e., a legitimate domain redirection). For example, WhoIs (a query and response protocol for identifying the registered users or assignees of an Internet resource, such as a domain name) may be used to identify the owner of domains in a graph. Table 1 (below) shows an example of high confidence rules containing domains that have the same Autonomous System Numbers (ASNs). Such associations are most likely due to legitimate redirection.

TABLE 1

Domains with the same ASN are likely to be legitimate redirections.

| Domain A | Domain B | P(A\|B) | P(B\|A) | ASN |
|---|---|---|---|---|
| phconferences.com | ph-conference.com | 1 | 0.066 | 25843 |
| phconferences.com | my-healthcare-training.com | 1 | 0.002 | 25843 |

In some embodiments, the graph-based technique described above is integrated with other types of models. For example, an algorithmically generated domain (AGD) detection model may be used to prioritize association rules or sequential patterns that contain AGDs. The rule in Table 2 shows an example high probability (i.e., P(B|A)=0.5816) of a domain being redirected from an AGD.

TABLE 2

Association with an AGD may be given a higher priority for investigation.

| Domain A | Domain B | # of {A, B} | # of A | # of B | P(A \| B) | P(B \| A) | # of A to B | # of B to A | # of AB Same Time |
|---|---|---|---|---|---|---|---|---|---|
| updateflash player.info | uociwiiqgm qwwmkq.org (AGD domain) | 57 | 98 | 171825 | 0.0003 | 0.5816 | 4 | 26 | 27 |

Figure 12:
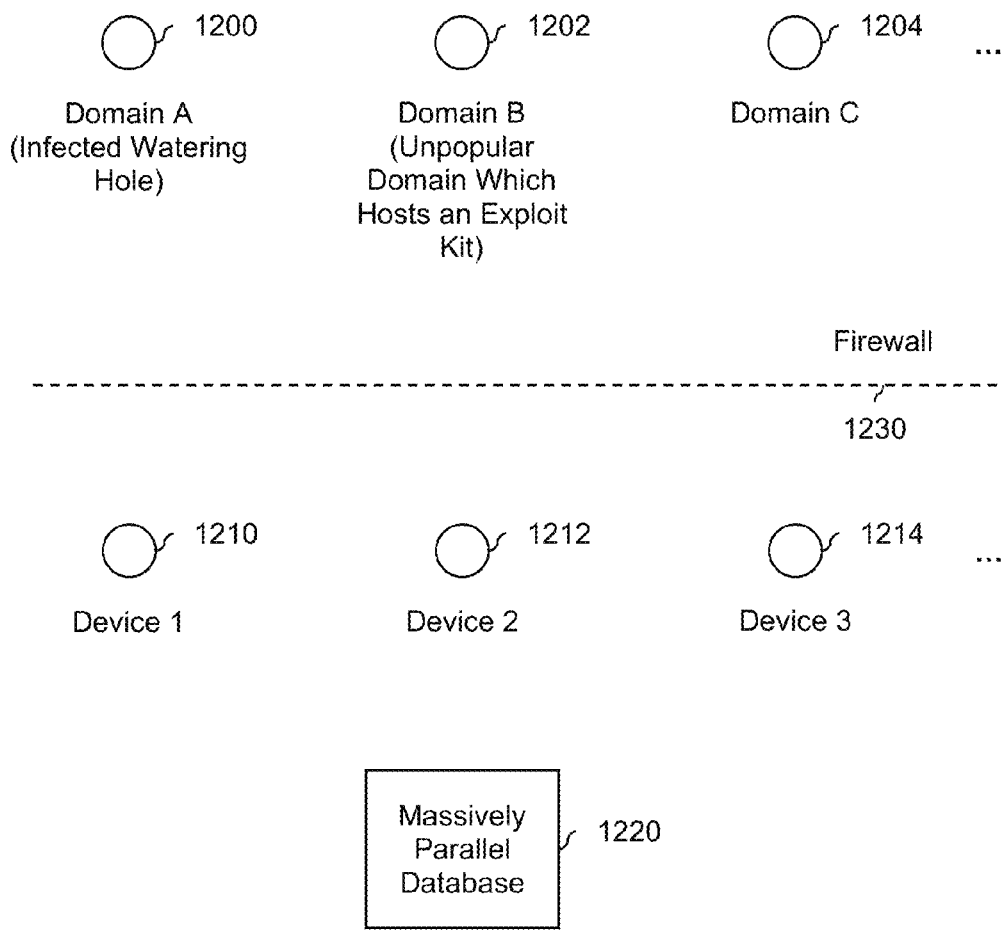
FIG. 12 is a diagram illustrating an embodiment of a system which detects attacks using graphs.

FIG. 12 is a diagram illustrating an embodiment of a system which detects attacks using graphs. In this particular example, a watering hole attack is being detected but a bot-net attack may also be detected by the system shown here. In the example shown, devices 1210, 1212, and 1214 are behind a firewall (1230). For example, the devices may be computers, mobile telephones, or other devices owned by a company and/or used by the company's employees. The users of devices 1210, 1212, and 1214, visit domains 1210, 1202, and 1204 which include an infected watering hole (1200) and a domain which hosts an exploit kit (1202). Devices 1210, 1212, and 1214 send their proxy logs to massively parallel database 1220 which performs watering hole detection using one or more of the embodiments described above.

In some embodiments, proxy logs are periodically sent from devices 1210, 1212, and 1214 to massively parallel database 1220 (e.g., containing incremental information that occurred since the last proxy log was sent) and watering hole attack detection is performed on a periodic basis. This may be desirable because it keeps the amount of ingested proxy log information to a reasonable amount of information and the run times are correspondingly reasonable.

In some embodiments, performing the graph-based detection technique described above on a massively parallel database is attractive because graphs (with its nodes and edges) lend themselves easily to representation in a database or table format (e.g., which is support by MPP 1220).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
process one or more proxy logs in order to generate a graph of domains, wherein those domain pairs in the graph that are connected have low support in that the number of times the domain pairs are visited is lower than a predetermined support threshold and high confidence in that users accessing the domain pairs are redirected to another domain a greater number of times than a predetermined confidence threshold;
identify one or more domains within the graph that are highly connected to other domains in the graph in that the one or more domains have a degree of connectivity to said other domains higher than a connectivity threshold; and
flag the identified domains as suspicious domains, wherein processing the proxy logs includes:
deciding whether to normalize domain names;
in the event it is decided to normalize domain names, normalizing domain names so that all domain names are at a same level;
deciding whether to filter domain names using a whitelist;
in the event it is decided to filter domain names, filtering out whitelisted domains using the whitelist;
filtering out invalid domain names;
performing user-specific sessionization using a specified time window to create a plurality of buckets;

calculating a support value and a confidence value for each possible domain pair from the overall plurality of buckets in the full dataset; and creating an edge in the graph between those domain pairs that have a support value that is less than a support threshold and a confidence value that is greater than a confidence threshold.

2. The system recited in claim 1, wherein processing the proxy logs includes:
- for each domain in the graph, determining an OddBall ratio for that domain;
- comparing each of the determined OddBall ratios against the connectivity threshold; and
- identifying those domains with an OddBall ratio greater than the connectivity threshold as being highly connected.

3. The system recited in claim 1, wherein identifying the domains includes:
- for each domain in the graph, determining a clique percentage for that domain;
- comparing each of the determined clique percentages against the connectivity threshold; and
- selecting those domains with a clique percentage greater than the connectivity threshold.

4. The system recited in claim 1, wherein identifying the domains includes:
- identifying one or more connected components in the graph, wherein each of the connected components has a size; and
- comparing each of the sizes of the connected components against a size threshold; and
- selecting those connected components with a size smaller than the size threshold.

5. The system recited in claim 1, wherein the system includes a parallel database.

6. A method, comprising:
- using a processor to process one or more proxy logs in order to generate a graph of domains, wherein those domain pairs in the graph that are connected have low support in that the number of times the domain pairs are visited is lower than a predetermined support threshold and high confidence in that users accessing the domain pairs are redirected to another domain a greater number of times than a predetermined confidence threshold;
- identifying one or more domains within the graph that are highly connected to other domains in the graph in that the one or more domains have a degree of connectivity to said other domains higher than a connectivity threshold; and
- flagging the identified domains as suspicious domains, wherein processing the proxy logs includes:
- deciding whether to normalize domain names;
- in the event it is decided to normalize domain names, normalizing domain names so that all domain names are at a same level;
- deciding whether to filter domain names using a whitelist;
- in the event it is decided to filter domain names, filtering out whitelisted domains using the whitelist;
- filtering out invalid domain names;
- performing user-specific sessionization using a specified time window to create a plurality of buckets;
- calculating a support value and a confidence value for each possible domain pair from the overall plurality of buckets in the full dataset; and
- creating an edge in the graph between those domain pairs that have a support value that is less than a support threshold and a confidence value that is greater than a confidence threshold.

7. The method recited in claim 6, wherein processing the proxy logs includes:
- for each domain in the graph, determining an OddBall ratio for that domain;
- comparing each of the determined OddBall ratios against the connectivity threshold; and
- identifying those domains with an OddBall ratio greater than the connectivity threshold as being highly connected.

8. The method recited in claim 6, wherein identifying the domains includes:
- for each domain in the graph, determining a clique percentage for that domain;
- comparing each of the determined clique percentages against the connectivity threshold; and
- selecting those domains with a clique percentage greater than the connectivity threshold.

9. The method recited in claim 6, wherein identifying the domains includes:
- identifying one or more connected components in the graph, wherein each of the connected components has a size; and
- comparing each of the sizes of the connected components against a size threshold; and
- selecting those connected components with a size smaller than the size threshold.

10. The method recited in claim 6, wherein the method is performed by a parallel database.

11. A computer program product, the computer program product being embodied in a non-transitory computer readable storage medium and comprising computer instructions for:
- processing one or more proxy logs in order to generate a graph of domains, wherein those domain pairs in the graph that are connected have in that the number of times the domain pairs are visited is lower than a predetermined support threshold and high confidence in that users accessing the domain pairs are redirected to another domain a greater number of times than a predetermined confidence threshold;
- identifying one or more domains within the graph that are highly connected to other domains in the graph in that the one or more domains have a degree of connectivity to said other domains higher than a connectivity threshold; and
- flagging the identified domains as suspicious domains, wherein processing the proxy logs includes:
- deciding whether to normalize domain names;
- in the event it is decided to normalize domain names, normalizing domain names so that all domain names are at a same level;
- deciding whether to filter domain names using a whitelist;
- in the event it is decided to filter domain names, filtering out whitelisted domains using the whitelist;
- filtering out invalid domain names;
- performing user-specific sessionization using a specified time window to create a plurality of buckets;
- calculating a support value and a confidence value for each possible domain pair from the overall plurality of buckets in the full dataset; and creating an edge in the graph between those domain pairs that have a support value that is less than a support threshold and a confidence value that is greater than a confidence threshold.

12. The computer program product recited in claim 11, wherein processing the proxy logs includes:
   for each domain in the graph, determining an OddBall ratio for that domain;
   comparing each of the determined OddBall ratios against the connectivity threshold; and
   identifying those domains with an OddBall ratio greater than the connectivity threshold as being highly connected.

13. The computer program product recited in claim 11, wherein identifying the domains includes:
   for each domain in the graph, determining a clique percentage for that domain;
   comparing each of the determined clique percentages against the connectivity threshold; and
   selecting those domains with a clique percentage greater than the connectivity threshold.

14. The computer program product recited in claim 11, wherein identifying the domains includes:
   identifying one or more connected components in the graph, wherein each of the connected components has a size; and
   comparing each of the sizes of the connected components against a size threshold; and
   selecting those connected components with a size smaller than the size threshold.

* * * * *